United States Patent
Lucas et al.

(10) Patent No.: US 9,244,785 B2
(45) Date of Patent: Jan. 26, 2016

(54) SIMULATED POWER FAILURE AND DATA HARDENING

(71) Applicant: SanDisk Enterprise IP LLC, Milpitas, CA (US)

(72) Inventors: Gregg S. Lucas, Tucson, AZ (US); Kenneth B. Delpapa, Natick, MA (US); Robert W. Ellis, Phoenix, AZ (US)

(73) Assignee: SANDISK ENTERPRISE IP LLC, Milpitas, CA (US)

( * ) Notice: Subject to any disclaimer, the term of this patent is extended or adjusted under 35 U.S.C. 154(b) by 81 days.

(21) Appl. No.: 14/135,456

(22) Filed: Dec. 19, 2013

(65) Prior Publication Data

US 2015/0135008 A1  May 14, 2015

Related U.S. Application Data

(60) Provisional application No. 61/903,895, filed on Nov. 13, 2013.

(51) Int. Cl.
*G06F 11/00* (2006.01)
*G06F 11/20* (2006.01)
*G06F 12/02* (2006.01)
(Continued)

(52) U.S. Cl.
CPC .......... *G06F 11/2017* (2013.01); *G06F 3/0619* (2013.01); *G06F 11/1441* (2013.01); *G06F 12/0246* (2013.01)

(58) Field of Classification Search
CPC ... G06F 12/0246; G06F 1/30; G06F 11/1441; G06F 2212/1032; G06F 3/0619; G06F 3/0653
See application file for complete search history.

(56) References Cited

U.S. PATENT DOCUMENTS

| 4,173,737 A | 11/1979 | Skerlos et al. |
| 4,888,750 A | 12/1989 | Kryder et al. |
| 4,916,652 A | 4/1990 | Schwarz et al. |

(Continued)

FOREIGN PATENT DOCUMENTS

| EP | 1 299 800 | 4/2003 |
| EP | 1465203 A1 | 10/2004 |

(Continued)

OTHER PUBLICATIONS

Invitation to Pay Additional Fees dated Feb. 13, 2015, received in International Patent Apptication No. PCT/US2014/063949, which corresponds to U.S. Appl. No. 14/135,433, 6 pages (Delpapa).

(Continued)

*Primary Examiner* — Charles Ehne
(74) *Attorney, Agent, or Firm* — Morgan, Lewis & Bockius LLP

(57) ABSTRACT

The various implementations described herein include systems, methods and/or devices used to enable power sequencing and data hardening in a storage device. In one aspect, a method includes, in response to a first signal received by the storage device, performing a soft power fail operation on a first section of the storage device. The soft power fail operation including: (1) signaling a power fail condition to a first plurality of controllers on the storage device, where the first plurality of controllers correspond to the first section of the storage device, (2) transferring data held in volatile memory of the storage device to non-volatile memory of the storage device, and (3) removing power from the first plurality of controllers.

27 Claims, 9 Drawing Sheets

(51) Int. Cl.
*G06F 11/14* (2006.01)
*G06F 3/06* (2006.01)

(56) References Cited

U.S. PATENT DOCUMENTS

| | | |
|---|---|---|
| 5,129,089 A | 7/1992 | Nielsen |
| 5,270,979 A | 12/1993 | Harari et al. |
| 5,329,491 A | 7/1994 | Brown et al. |
| 5,381,528 A | 1/1995 | Brunelle |
| 5,519,847 A | 5/1996 | Fandrich et al. |
| 5,530,705 A | 6/1996 | Malone, Sr. |
| 5,537,555 A | 7/1996 | Landry et al. |
| 5,551,003 A | 8/1996 | Mattson et al. |
| 5,636,342 A | 6/1997 | Jeffries |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,936,884 A | 8/1999 | Hasbun et al. |
| 5,943,692 A | 8/1999 | Marberg et al. |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,295,592 B1 | 9/2001 | Jeddeloh |
| 6,311,263 B1 | 10/2001 | Barlow et al. |
| 6,408,394 B1 | 6/2002 | Vander Kamp et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,678,788 B1 | 1/2004 | O'Connell |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,162,678 B2 | 1/2007 | Saliba |
| 7,173,852 B2 | 2/2007 | Gorobets et al. |
| 7,184,446 B2 | 2/2007 | Rashid et al. |
| 7,275,170 B2 | 9/2007 | Suzuki |
| 7,328,377 B1 | 2/2008 | Lewis et al. |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry, Jr. et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich et al. |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,312,349 B2 | 11/2012 | Reche et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,627,117 B2 | 1/2014 | Johnston |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,885,434 B2 | 11/2014 | Kumar |
| 8,898,373 B1 | 11/2014 | Kang et al. |
| 8,910,030 B2 | 12/2014 | Goel |
| 8,923,066 B1 | 12/2014 | Subramanian et al. |
| 9,128,690 B2 | 9/2015 | Lotzenburger et al. |
| 2001/0050824 A1 | 12/2001 | Buch |
| 2002/0024846 A1 | 2/2002 | Kawahara et al. |
| 2002/0036515 A1 | 3/2002 | Eldridge et al. |
| 2002/0083299 A1 | 6/2002 | Van Huben et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid et al. |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0167898 A1 | 8/2004 | Margolus et al. |
| 2004/0181734 A1 | 9/2004 | Saliba |
| 2004/0199714 A1 | 10/2004 | Estakhri et al. |

(56) References Cited

U.S. PATENT DOCUMENTS

| | | |
|---|---|---|
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0085671 A1 | 4/2006 | Majni et al. |
| 2006/0087893 A1 | 4/2006 | Nishihara et al. |
| 2006/0107181 A1 | 5/2006 | Dave et al. |
| 2006/0136570 A1 | 6/2006 | Pandya |
| 2006/0136681 A1 | 6/2006 | Jain et al. |
| 2006/0156177 A1 | 7/2006 | Kottapalli et al. |
| 2006/0195650 A1 | 8/2006 | Su et al. |
| 2006/0244049 A1 | 11/2006 | Yaoi et al. |
| 2006/0259528 A1 | 11/2006 | Dussud et al. |
| 2006/0291301 A1 | 12/2006 | Ziegelmayer |
| 2007/0011413 A1 | 1/2007 | Nonaka et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0113019 A1 | 5/2007 | Beukema et al. |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0201274 A1 | 8/2007 | Yu et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0056005 A1 | 3/2008 | Aritome |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0249160 A1 | 10/2009 | Gao et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1* | 1/2010 | Cagno et al. .................. 714/719 |
| 2010/0020620 A1 | 1/2010 | Kim et al. |
| 2010/0037012 A1 | 2/2010 | Yano et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0199125 A1 | 8/2010 | Reche |
| 2010/0199138 A1 | 8/2010 | Rho |
| 2010/0202196 A1 | 8/2010 | Lee et al. |
| 2010/0208521 A1 | 8/2010 | Kim et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0332858 A1 | 12/2010 | Trantham et al. |
| 2011/0010514 A1 | 1/2011 | Benhase et al. |
| 2011/0051513 A1 | 3/2011 | Shen et al. |
| 2011/0066597 A1 | 3/2011 | Mashtizadeh et al. |
| 2011/0072302 A1 | 3/2011 | Sartore |
| 2011/0078407 A1 | 3/2011 | Lewis |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |

(56) References Cited

U.S. PATENT DOCUMENTS

| | | |
|---|---|---|
| 2011/0222342 A1 | 9/2011 | Yoon et al. |
| 2011/0225346 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2012/0023144 A1 | 1/2012 | Rub |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0185750 A1 | 7/2012 | Hayami |
| 2012/0195126 A1 | 8/2012 | Roohparvar |
| 2012/0203951 A1 | 8/2012 | Wood et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239976 A1 | 9/2012 | Cometti et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2013/0007073 A1 | 1/2013 | Varma |
| 2013/0007343 A1 | 1/2013 | Rub et al. |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0047045 A1 | 2/2013 | Hu et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0111279 A1 | 5/2013 | Jeon et al. |
| 2013/0111298 A1 | 5/2013 | Seroff et al. |
| 2013/0121084 A1 | 5/2013 | Jeon et al. |
| 2013/0124888 A1 | 5/2013 | Tanaka et al. |
| 2013/0128666 A1 | 5/2013 | Avila et al. |
| 2013/0132652 A1 | 5/2013 | Wood et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194874 A1 | 8/2013 | Mu et al. |
| 2013/0232289 A1 | 9/2013 | Zhong et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0301373 A1 | 11/2013 | Tam |
| 2013/0304980 A1 | 11/2013 | Nachimuthu et al. |
| 2013/0343131 A1 | 12/2013 | Wu et al. |
| 2014/0013188 A1 | 1/2014 | Wu et al. |
| 2014/0063905 A1 | 3/2014 | Ahn et al. |
| 2014/0075133 A1 | 3/2014 | Li et al. |
| 2014/0082261 A1* | 3/2014 | Cohen et al. ............ 711/103 |
| 2014/0082456 A1 | 3/2014 | Liu |
| 2014/0082459 A1 | 3/2014 | Li et al. |
| 2014/0095775 A1 | 4/2014 | Talagala et al. |
| 2014/0122818 A1 | 5/2014 | Hayasaka et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0201596 A1 | 7/2014 | Baum et al. |
| 2014/0258755 A1* | 9/2014 | Stenfort ............ 713/323 |
| 2014/0269090 A1 | 9/2014 | Flynn et al. |
| 2014/0359381 A1 | 12/2014 | Takeuchi et al. |
| 2015/0153799 A1 | 6/2015 | Lucas et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 S | 10/2002 |
| WO | WO 2007/036834 A2 | 4/2007 |
| WO | WO 2007/080586 A2 | 7/2007 |
| WO | WO 2008/075202 | 6/2008 |
| WO | WO 2008/121553 A1 | 10/2008 |
| WO | WO 2008/121577 A1 | 10/2008 |
| WO | WO 2009/028281 A1 | 3/2009 |
| WO | WO 2009/032945 A1 | 3/2009 |
| WO | WO 2009/058140 A1 | 5/2009 |
| WO | WO 2009/084724 | 7/2009 |
| WO | WO 2009/134576 A1 | 11/2009 |
| WO | WO 2011/024015 | 3/2011 |

OTHER PUBLICATIONS

International Search Report and Written Opinion dated Jan. 21, 2015, received in triternational Application No. PCT/US2014/059748, which corresponds to U.S. Appl. No. 14/137,511, 13 pages (Dancho).

International Search Report and Written Opinion dated Feb. 18, 2015, received in International Application No. PST/US2014/066921, which corresponds to U.S Appl. No. 14/135,260, 13 pages (Fitzpatrick).

International Search Report and Written Opinion dated Jul. 25, 2014, received in International Patent Application No. PCT/US2014/029453, which corresponds to U.S. Appl. No. 13/963,444, 9 pages (Frayer).

International Search Report and Written Opinion dated Mar. 7, 2014, received in International Patent Application No. PCT/US2013/074772, which corresponds to U.S. Appl. No. 13/831,218, 10 pages (Geroge).

International Search Report and Written Opinion dated Mar. 24, 2014, received in International Patent Application No. PCT/US2013/074777, which corresponds to U.S. Appl. No. 13/831,308, 10 pages (George).

Internationial Search Report and Written Opinion dated Mar. 7, 2014, received in International Patent Application No. PCT/US2013/074779, which corresponds to U.S. Appl. No. 13/831,374, 8 pages (George).

Barr, Introduction to Watchdog Timers, Oct. 2001, 3 pgs.

Canim, Buffered Bloom ilters on Solid State Storage, ADMS*10, Singapore, 13-17SEP2010, 8 pgs.

Kang, A Multi-Channel Architecture for High-Performance NAND Flash-Based Storage System, J. Syst. Archit., 53, 9, Sep. 2007, 15 pgs.

Kim, A Space-Efficient Flash Translation Layer for CompactFlash Systems, May 2002, 10 pgs.

Lu, A Forest-structured Bloom Filter with Flash Memory, MSST 2011, Denver, CO, May 23-27, 2011, article, 6 pgs.

Lu, A Forest-structured Bloom Filter with Flash Memory, MSST 2011, Denver, CO, May 23-27, 2011, presentation slides, 25 pgs.

McLean, Information Technology-AT Attachment with Packet Interface Extension, Aug. 19, 1998, 339 pgs.

Park, A High Performance Controller for NAND Flash-Based Solid State Disk (NSSD), Feb. 12-16, 2006, 4 pgs.

Pliant Technology, International Search Report / Written Opinion, PCT/US08/88133, Mar. 19, 2009, 7 pgs.

Pliant Technology, International Search Report / Written Opinion, PCT/US08/88136, Mar. 19, 2009, 7 pgs.

Pliant Technology, International Search Report / Written Opinion, PCT/US08/88146, Feb. 26, 2009, 10 pgs.

Pliant Technology, International Search Report / Written Opinion, PCT/US08/88154, Feb. 27, 2009, 8 pgs.

Pliant Technology, International Search Report / Written Opinion, PCT/US08/88164, Feb. 13, 2009, 6 pgs.

(56) References Cited

OTHER PUBLICATIONS

Pliant Technology, International Search Report / Written Opinion, PCT/US08/88206, Feb. 18, 2009, 8 pgs.
Pliant Technology, International Search Report / Written Opinion, PCT/US08/88217, Feb. 19, 2009, 7 pgs.
Pliant Technology, International Search Report / Written Opinion, PCT/US08/88229, Feb. 13, 2009, 7 pgs.
Pliant Technology, International Search Report / Written Opinion, PCT/US08/88232, Feb. 19, 2009, 8 pgs.
Pliant Technology, International Search Report / Written Opinion, PCT/US08/88236, Feb. 19, 2009, 7 pgs.
Pliant Technology, International Search Report / Written Opinion, PCT/US2011/028637, Oct. 27, 2011, 11 pgs.
Pliant Technology, Supplementary ESR, 08866997.3, Feb. 23, 2012, 6 pgs.
SanDisk Enterprise IP LLC, International Search Report / Written Opinion, PCT/US2012/042764, Aug. 31, 2012, 12 pgs.
SanDisk Enterprise IP LLC, International Search Report / Written Opinion, PCT/US2012/042771, Mar. 4, 2013, 14 pgs.
SanDisk Enterprise IP LLC, International Search Report / Written Opinion, PCT/US2012/042775, Sep. 26, 2012, 8 pgs.
SanDisk Enterprise IP LLC, International Search Report / Written Opinion, PCT/US2012/059447, Jun. 6, 2013, 12 pgs.
SanDisk Enterprise IP LLC, International Search Report / Written Opinion, PCT/US2012/059453, Jun. 6, 2013, 12 pgs.
Sandisk Enterprise IP LLC, International Search Report / Written Opinion, PCT/US2012/059459, Feb. 14, 2013, 9 pgs.
SanDisk Enterprise IP LLC, International Search Report / Written Opinion, PCT/US2012/065914, May 23, 2013, 7 pgs.
SanDisk Enterprise IP LLC, International Search Report / Written Opinion, PCT/US2012/065916, Apr. 5, 2013, 7 pgs.
SanDisk Enterprise IP LLC, International Search Report / Written Opinion, PCT/US2012/065919, Jun. 17, 2013, 8 pgs.
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul. 24, 2012, 3 pgs.
Watchdog Timer and Power Savin Modes, Microchip Technology Inc., 2005, 14 pgs.
Zeidman, 1999 Verilog Designer's Library, 9 pgs.
Ashkenazi et al., "Platform independent overall security architecture in mutli-processor system-on-chip integrated circuits for use in mobile phones and handheld devices." ScienceDirect, Computers and Electrical Engineering 33 (2007), 18 pages.
Lee et al., "A Semi-Preemptive Garbage Collector for Solid State Drives," Apr. 2011, IEEE, pp. 12-21.

Office Action dated Feb. 17, 2015, received in Chinese Patent Application No. 201210334987.1, which corresponds to U.S. Appl. No. 12/082,207, 9 pages (Prins).
International Search Report and Written Opinion dated May 4, 2015, received in International Patent Application No. PCT/US2014/065987, which corresponds to U.S. Appl. No. 14/135,400, 12 pages (George).
International Search Report and Writtne Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
Bayer, "Prefix B-Trees", IP.COM Journal, IP.COM Inc., West Henrietta, NY, Mar. 30, 2007, 29 pages.
Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.
Oracle, "Oracle9i: Database Concepts", Jul. 2001, http://docs.oracle.com/cd/A91202_01/901_doc/server.901/a88856.pdf, 49 pages.
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
International Search Report and Written Opinion dated Jul. 23, 2015, received in International Patent Application No. PCT/US2015/030850, which corresponds to U.S. Appl. No. 14/298,843, 12 pages (Ellis).
Office Action dated Dec. 8, 2014, received in Chinese Patent Application No. 201180021660.2, which corresponds to U.S. Appl. No. 12/726,200, 7 pages (Olbrich).
Office Action dated Jul. 31, 2015, received in Chinese Patent Application No. 201180021660.2, which corresponds to U.S. Appl. No. 12/726,200, 9 pages (Olbrich).
International Search Report and Written Opinion dated Sep. 14, 2015, received in International Patent Application No. PCT/US2015/036807, which corresponds to U.S. Appl. No. 14/311,152, 9 pages (Higgins).

\* cited by examiner

SIMULATED POWER FAILURE AND DATA HARDENING

RELATED APPLICATIONS

This application claims priority to U.S. Provisional Patent Application No. 61/903,895, filed Nov. 13, 2013, which is hereby incorporated by reference in its entirety.

TECHNICAL FIELD

The disclosed embodiments relate generally to memory systems, and in particular, to power sequencing and data hardening in storage devices.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. However, it is important to protect data integrity during power disruption events.

SUMMARY

Data hardening, the saving of data and mission critical metadata held in volatile storage, is an integral part of the storage devices disclosed in this document. As discussed more fully elsewhere in this document, when there is a power failure, mission critical data may reside in volatile memory in a number of sub-system components. Coordinating and managing multiple sub-system components to ensure that volatile data is saved successfully is important for safeguarding data integrity in a storage device.

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable power sequencing and data hardening in storage devices. In one aspect, a soft power fail operation is performed in response to a signal received or detected by a storage device.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
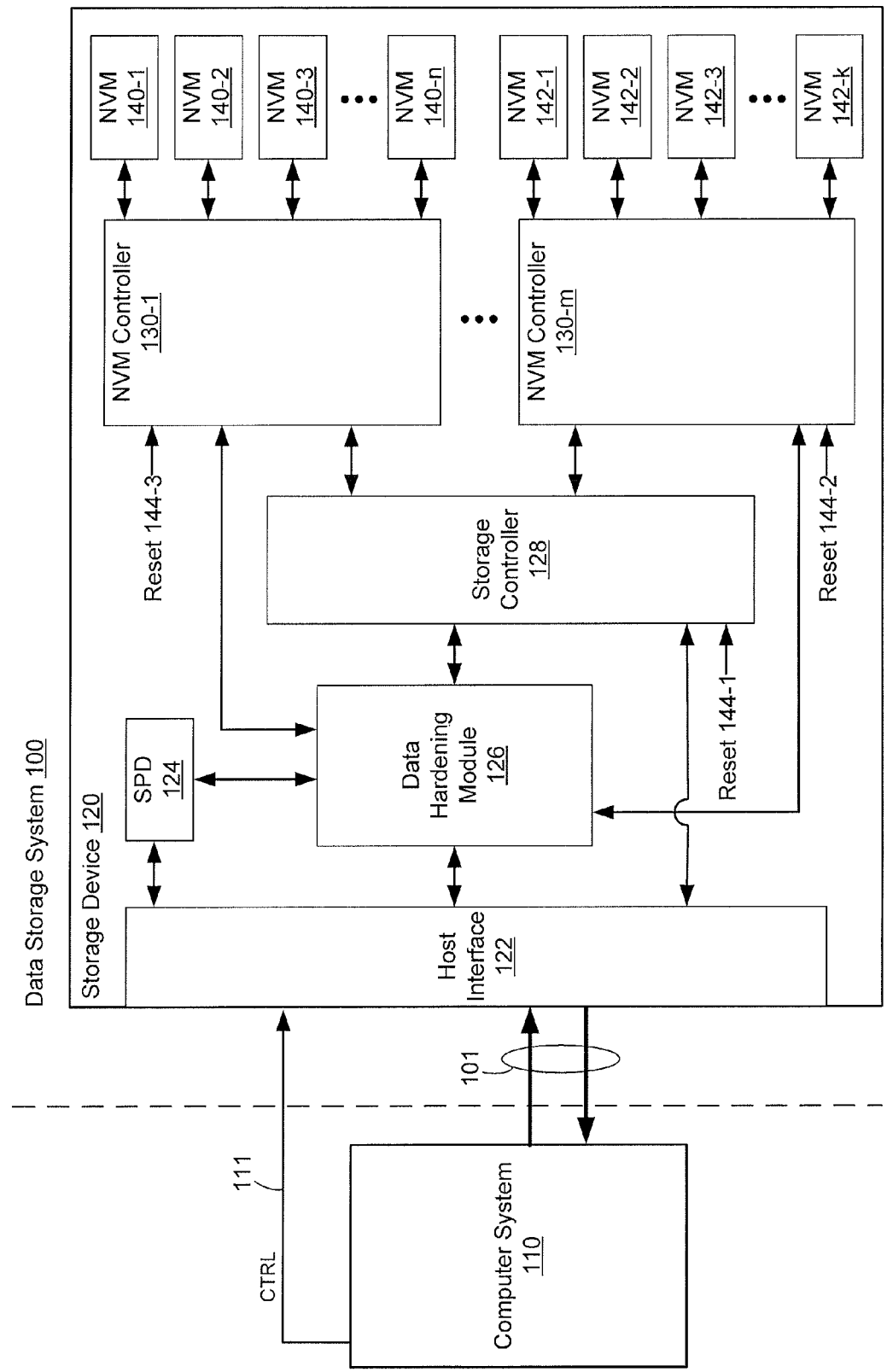
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable power sequencing and data hardening in storage devices. Some implementations include systems, methods and/or devices to perform a soft power fail operation in response to a soft power fail signal.

More specifically, some implementations include a method of protecting data in a storage device comprising volatile memory and non-volatile memory. In some implementations, the method includes, in response to a first signal received or detected by the storage device, performing a soft power fail operation on a first section of the storage device. The soft power fail operation including: (1) signaling a power fail condition to a first plurality of controllers on the storage device, where the first plurality of controllers correspond to the first section of the storage device, (2) transferring data held in the volatile memory of the storage device to the non-volatile memory of the storage device, and (3) removing power from the first plurality of controllers.

In some embodiments, the first plurality of controllers includes at least one non-volatile storage controller and at least one other storage controller.

In some embodiments, the first plurality of controllers includes a storage controller and one or more non-volatile memory (NVM) controllers, the one or more NVM controllers coupled by the storage controller to a host interface of the storage device.

In some embodiments, transferring data held in the volatile memory of the storage device to the non-volatile memory of the storage device includes: (1) transferring data from the storage controller to the one or more NVM controllers, and (2) transferring data from the one or more NVM controllers to the non-volatile memory.

In some embodiments, removing power from the first plurality of controllers includes: (1) resetting the storage controller subsequent to transferring data from the storage controller to the one or more NVM controllers, and (2) removing power from the storage controller subsequent to resetting the storage controller.

In some embodiments, the one or more NVM controllers include a first NVM controller and a second NVM controller, and removing power from the first plurality of controllers includes: (1) resetting the first NVM controller subsequent to transferring data from the first NVM controller to the non-volatile memory, (2) resetting the second NVM controller subsequent to transferring data from the second NVM controller to the non-volatile memory, and (3) removing power from the first and the second NVM controllers subsequent to resetting the first and second NVM controllers.

In some embodiments, removing power from the first and the second NVM controllers is subsequent to removing power from the storage controller.

In some embodiments, the soft power fail operation further includes, subsequent to removing power from the first plurality of controllers, restoring power to the first plurality of controllers.

In some embodiments, the storage device includes a second section that is not part of the first section, and a second plurality of controllers on the storage device corresponding to the second section continue running independent of the soft power fail operation on the first section of the storage device.

In some embodiments, removing power from the first plurality of controllers includes bringing an energy storage device to a discharged state.

In some embodiments, the energy storage device is tested for quality.

In some embodiments, the soft power fail operation further includes providing power to the first plurality of controllers on the storage device from an energy storage device distinct from a power source used during normal operation of the storage device.

In some embodiments, the soft power fail operation further includes, prior to removing power from the first plurality of controllers, installing firmware on at least a subset of the first plurality of controllers on the storage device.

In some embodiments, the method further includes, in response to a second signal received or detected by the storage device, performing a soft power fail operation on a second section of the storage device, distinct from the first section.

In some embodiments, the soft power fail operation is controlled by a storage level microcontroller and, during the soft power fail operation, the storage level microcontroller receives status information from components in the first section of the storage device.

In some embodiments, the method further includes: (1) in response to a third signal received or detected by the storage device, determining whether a power fail operation is in progress on the storage device, and (2) in accordance with a determination that the power fail operation is in progress, forgoing performance of a soft power fail operation in response to the third signal.

In some embodiments, signaling the power fail condition to the first plurality of controllers on the storage device includes separately signaling the power fail condition to each controller in the first plurality of controllers.

In some embodiments, the method further comprises recording data regarding the soft power fail operation to non-volatile memory.

In another aspect, any of the methods described above are performed by a storage device including a first plurality of controllers, each of the first plurality of controllers configured to transfer data held in volatile memory to non-volatile memory, and a data hardening module configured to: receive or detect a first signal to simulate a power failure, in response to receiving or detecting the first signal, perform a soft power fail operation on a first section of the storage device, the soft power fail operation including: (1) signaling a power fail condition to a second plurality of controllers on the storage device, where the second plurality of controllers correspond to the first section of the storage device and comprise some or all of the first plurality of controllers, (2) transferring data held in volatile memory to non-volatile memory, and (3) removing power from the second plurality of controllers.

In some embodiments, the storage device includes an interface for coupling the storage device to a host system.

In some embodiments, the data hardening module further includes an energy storage device.

In some embodiments, the data hardening module includes one or more processors.

In some embodiments, the second plurality of controllers includes a storage controller and one or more non-volatile memory (NVM) controllers, the one or more NVM controllers coupled by the storage controller to a host interface of the storage device.

In some embodiments, the storage device is configured to operate in accordance with any of the methods described above.

In yet another aspect, any of the methods described above are performed by a storage device including: (1) memory, (2) one or more processors coupled to the memory, and (3) one or more programs, stored in the memory and executed by the one or more processors, the one or more programs including instructions for performing any of the methods described above.

In yet another aspect, any of the methods described above are performed by a storage device operable to protect data. In some embodiments, the device includes (1) means for receiving or detecting a first signal to simulate a power failure, and (2) means, responsive to receiving or detecting the first signal, for performing a soft power fail operation on a first section of the storage device, the means for performing the soft power fail operation including: (a) means for signaling a power fail condition to a first plurality of controllers on the storage device, where the first plurality of controllers correspond to the first section of the storage device, (b) means for transferring data held in volatile memory to non-volatile memory, and (c) means for removing power from the first plurality of controllers. In some embodiments, the storage device includes an interface for coupling the storage device to a host system.

In yet another aspect, a non-transitory computer readable storage medium, storing one or more programs for execution by one or more processors of a storage device having a plurality of controllers and a data hardening module, the one or more programs including instructions for performing any of the methods described above.

In some embodiments, the non-transitory computer readable storage medium includes a non-transitory computer readable storage medium associated with each of the plurality of controllers on the storage device and a non-transitory computer readable storage medium associated with the data hardening module.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes storage device 120 (also sometimes called an information storage device, or a data storage device, or a memory device), which includes host interface 122, serial presence detect (SPD) device 124, data hardening module 126, storage controller 128 (sometimes herein called a controller or memory controller), one or more non-volatile memory (NVM) controllers 130 such as flash controllers, and non-volatile memory (e.g., one or more NVM device(s) 140, 142 such as one or more flash memory devices), and is used in conjunction with computer system 110. In some implementations, storage device 120 includes a single NVM device while in other implementations storage device 120 includes a plurality of NVM devices. In some implementations, NVM devices 140, 142 include NAND-type flash memory or NOR-type flash memory. Further, in some implementations, NVM controller 130 is a solid-state drive (SSD) controller. However, one or more other types of storage media may be included in accordance with aspects of a wide variety of implementations.

Computer system 110 is coupled to storage device 120 through data connections 101. However, in some implementations computer system 110 includes storage device 120 as a component and/or sub-system. In some such embedded implementations, data connections 101 and host interface 122 are not needed. Computer system 110 may be any suitable computer device, such as a personal computer, a workstation, a computer server, or any other computing device. Computer system 110 is sometimes called a host or host system. In some implementations, computer system 110 includes one or more processors, one or more types of memory, optionally includes a display and/or other user interface components such as a keyboard, a touch screen display, a mouse, a track-pad, a digital camera and/or any number of supplemental devices to add functionality. Further, in some implementations, computer system 110 sends one or more host commands (e.g., read commands and/or write commands) on control line 111 to storage device 120. In some implementations, computer system 110 is a server system, such as a server system in a data center, and does not have a display and other user interface components.

In some implementations, storage device 120 includes NVM devices 140, 142 such as flash memory devices (e.g., NVM devices 140-1 through 140-n and NVM devices 142-1 through 142-k) and NVM controllers 130 (e.g., NVM controllers 130-1 through 130-m). In some implementations, each NVM controller of NVM controllers 130 include one or more processing units (also sometimes called CPUs or processors or microprocessors or microcontrollers) configured to execute instructions in one or more programs (e.g., in NVM controllers 130). In some implementations, the one or more processors are shared by one or more components within, and in some cases, beyond the function of NVM controllers 130. In some implementations, NVM controllers 130 are configured to receive (e.g., via reset module 412, FIG. 4) reset 144 from various components of storage device 120 (e.g., from data hardening module 126 and/or from storage controller 128). In some implementations, reset 144-2 and reset 144-3 are the same signal.

NVM devices 140, 142 are coupled to NVM controllers 130 through connections that typically convey commands in addition to data, and optionally convey metadata, error correction information and/or other information in addition to data values to be stored in NVM devices 140, 142 and data values read from NVM devices 140, 142. For example, NVM devices 140, 142 can be configured for enterprise storage suitable for applications such as cloud computing, or for caching data stored (or to be stored) in secondary storage, such as hard disk drives. Additionally and/or alternatively, flash memory (e.g., NVM devices 140, 142) can also be configured for relatively smaller-scale applications such as personal flash drives or hard-disk replacements for personal, laptop and tablet computers. Although flash memory devices and flash controllers are used as an example here, in some embodiments storage device 120 includes other non-volatile memory device(s) and corresponding non-volatile storage controller(s).

In some implementations, storage device 120 also includes host interface 122, SPD device 124, data hardening module 126, and storage controller 128. Storage device 120 may include various additional features that have not been illustrated for the sake of brevity and so as not to obscure more pertinent features of the example implementations disclosed herein, and a different arrangement of features may be possible. Host interface 122 provides an interface to computer system 110 through data connections 101.

In some implementations, data hardening module 126 includes one or more processing units (also sometimes called CPUs or processors or microprocessors or microcontrollers) configured to execute instructions in one or more programs (e.g., in data hardening module 126). In some implementations, the one or more processors are shared by one or more components (e.g., storage controller 128) within, and in some cases, beyond the function of data hardening module 126. Data hardening module 126 is coupled to host interface 122, SPD device 124, storage controller 128, and NVM controllers 130 in order to coordinate the operation of these components, including supervising and controlling functions such as power up, power down, data hardening, charging energy storage device(s), data logging, and other aspects of managing functions on storage device 120.

Storage controller 128 is coupled to host interface 122, data hardening module 126, and NVM controllers 130. In some implementations, during a write operation, storage controller 128 receives data from computer system 110 through host interface 122 and during a read operation, storage controller 128 sends data to computer system 110 through host interface 122. Further, host interface 122 provides additional data, signals, voltages, and/or other information needed for communication between storage controller 128 and computer system 110. In some embodiments, storage controller 128 and host interface 122 use a defined interface standard for communication, such as double data rate type three synchronous dynamic random access memory (DDR3). In some embodiments, storage controller 128 and NVM controllers 130 use a defined interface standard for communication, such as serial advance technology attachment (SATA). In some other implementations, the device interface used by storage controller 128 to communicate with NVM controllers 130 is SAS (serial attached SCSI), or other storage interface. In some implementations, storage controller 128 is configured to receive (e.g., via reset module 310) reset 144-1 from various components of storage device 120 (e.g., from data hardening module 126 and/or from host interface 122). In some implementations, reset 144-1, reset 144-2, and reset 144-3 are the same signal. In some implementations, reset 144-1, reset 144-2, and reset 144-3 are independent signals. In some implementations, reset 144-1, reset 144-2, and reset 144-3 are controlled separately. In some implementations, storage controller 128 includes one or more processing units (also sometimes called CPUs or processors or microprocessors or microcontrollers) configured to execute instructions in one or more programs (e.g., in storage controller 128). In some implementations, the one or more processors are shared by one or more components within, and in some cases, beyond the function of storage controller 128.

SPD device 124 is coupled to host interface 122 and data hardening module 126. Serial presence detect (SPD) refers to a standardized way to automatically access information about a computer memory module (e.g., storage device 120). For example, information about the type of the device (e.g., where the device type is one of a predefined set of device types), and the storage capacity of the device can be communicated with a host system (e.g., computer system 110) through SPD device 124. In another example, if the memory module has a failure, the failure can be communicated with a host system (e.g., computer system 110) through SPD device 124.

Figure 2:
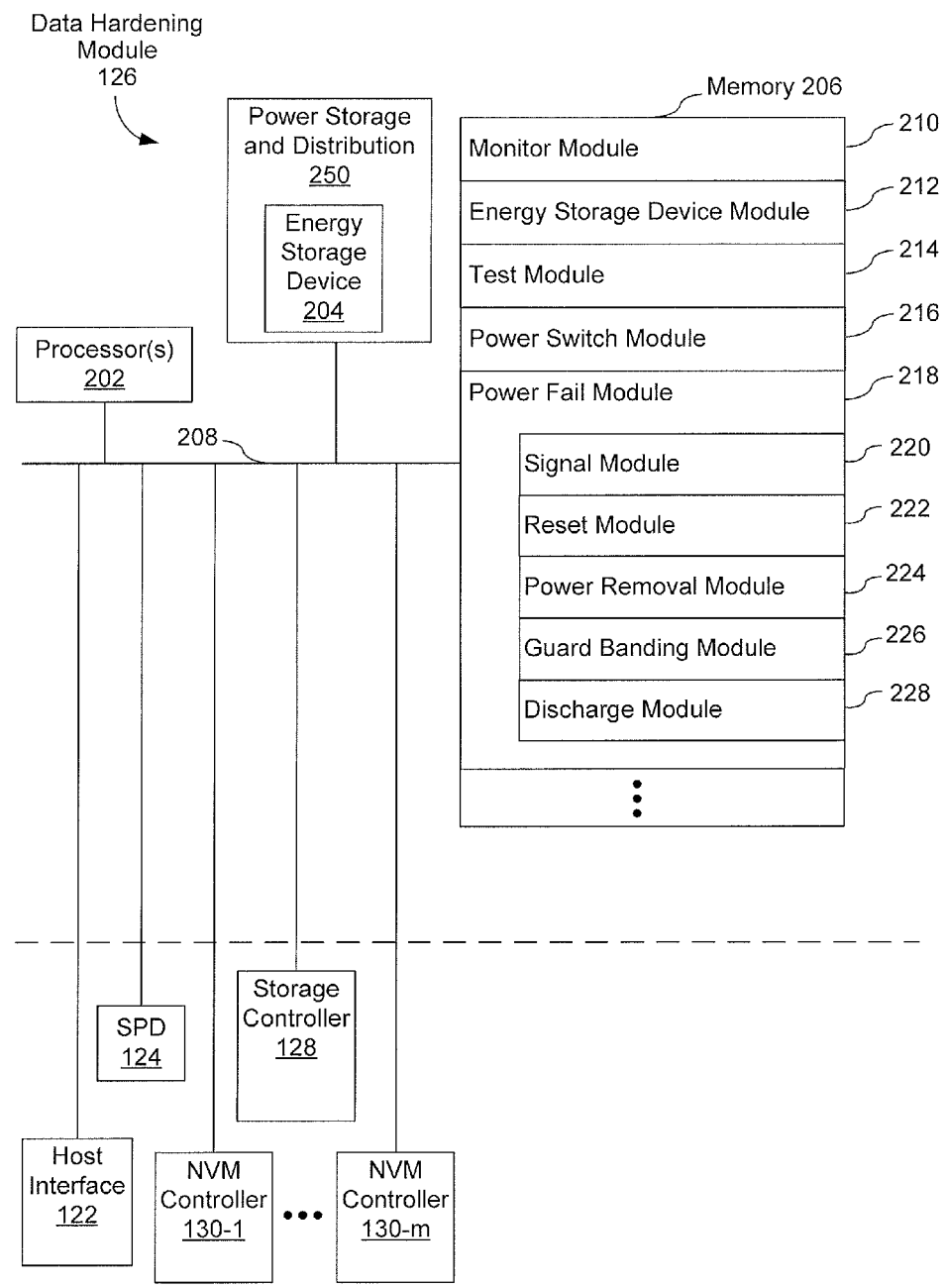
FIG. 2 is a block diagrams illustrating an implementation of a data hardening module, in accordance with some embodiments.

FIG. 2 is a block diagram illustrating an implementation of data hardening module 126, in accordance with some embodiments. Data hardening module 126 typically includes one or more processors (also sometimes called CPUs or processing units or microprocessors or microcontrollers) 202 for executing modules, programs and/or instructions stored in memory 206 and thereby performing processing operations, memory 206, power storage and distribution module 250 (including energy storage device 204), and one or more communication buses 208 for interconnecting these components. In some implementations, power storage and distribution module 250 includes circuitry for monitoring, storing, and distributing power for a memory device (e.g., storage device 120, FIG. 1), including monitoring, controlling, charging, and/or testing energy storage device 204. In some embodiments, energy storage device 204 includes one or more capacitors. In other embodiments, energy storage device 204 includes one or more inductors or any other passive elements that store energy.

Communication buses 208 optionally include circuitry (sometimes called a chipset) that interconnects and controls communications between system components. Data hardening module 126 is coupled to host interface 122, SPD device 124, storage controller 128, and NVM controllers 130 (e.g., NVM controllers 130-1 through 130-*m*) by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 202. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:

- a monitor module 210 that is used for monitoring signals provided to a storage device (e.g., storage device 120, FIG. 1), for example to monitor and determine whether a power supply voltage provided to the storage device is lower than an under-voltage threshold;
- an energy storage device module 212 that is used for monitoring, controlling, charging, and/or testing an energy storage device (e.g., energy storage device 204) on the storage device;
- a test module 214 that is used for testing one or more functions of the storage device;
- a power switch module 216 that is used for determining and controlling the voltage that is used to supply power to the storage device; and
- a power fail module 218 that is used for performing a power fail operation or a soft power fail operation in response to certain criterion or signals.

In some embodiments, memory 206, or the computer readable storage medium of memory 206 further stores a configuration module for configuring storage device 120 and data hardening module 126, and/or configuration values (such as one or more under-voltage threshold values) for configuring data hardening module 126, neither of which is explicitly shown in FIG. 2. In some implementations, upon power up and upon reset, the configuration module automatically sets the values of one or more configuration parameters of storage device 120 (and, optionally, determines which of two or more power fail modules, test modules, etc. to use) in accordance with the components of storage device 120 (e.g., the type of non-volatile memory components in storage device 120) and/or characteristics of the data storage system 100 that includes storage device 120.

In some embodiments, the power fail module 218 optionally includes the following modules or sub-modules, or a subset thereof:

- a signal module 220 that is used for signaling a power fail condition to a plurality of controllers on the storage device (e.g., storage controller 128 and NVM controllers 130, FIG. 1);
- a reset module 222 that is used for resetting the plurality of controllers on the storage device;
- a power removal module 224 that is used for removing power from the plurality of controllers on the storage device;
- a guard banding module 226 that is used for tolerating power fluctuations in a power supply voltage provided to the storage device; and
- a discharge module 228 that is used for discharging the energy storage device on the storage device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing any of the methods described below with reference to FIGS. 6A-6D.

Although FIG. 2 shows data hardening module 126, FIG. 2 is intended more as a functional description of the various features which may be present in a data hardening module than as a structural schematic of the embodiments described herein. In practice, and as recognized by those of ordinary skill in the art, items shown separately could be combined and some items could be separated.

Figure 3:
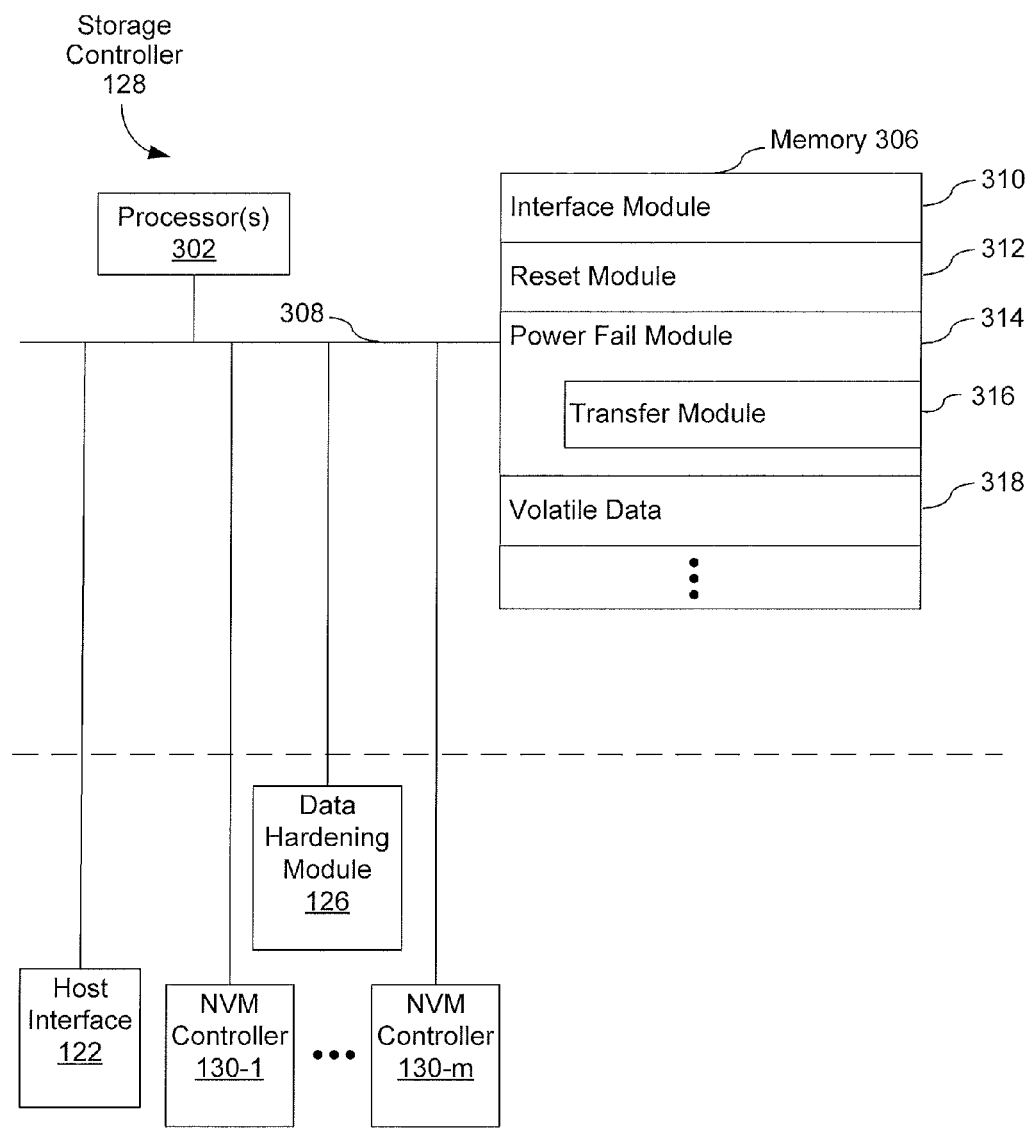
FIG. 3 is a block diagram illustrating an implementation of a storage controller, in accordance with some embodiments.

FIG. 3 is a block diagram illustrating an implementation of a storage controller 128, in accordance with some embodiments. Storage controller 128 typically includes one or more processors (also sometimes called CPUs or processing units or microprocessors or microcontrollers) 302 for executing modules, programs and/or instructions stored in memory 306 and thereby performing processing operations, memory 306, and one or more communication buses 308 for interconnecting these components. Communication buses 308 optionally include circuitry (sometimes called a chipset) that interconnects and controls communications between system components. Storage controller 128 is coupled to host interface 122, data hardening module 126, and NVM controllers 130 (e.g., NVM controllers 130-1 through 130-m) by communication buses 308. Memory 306 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 306 optionally includes one or more storage devices remotely located from processor(s) 302. Memory 306, or alternately the non-volatile memory device(s) within memory 306, comprises a non-transitory computer readable storage medium. In some embodiments, memory 306, or the computer readable storage medium of memory 306 stores the following programs, modules, and data structures, or a subset thereof:

- an interface module 310 that is used for communicating with other components, such as host interface 122, data hardening module 126, and NVM controllers 130;
- a reset module 312 that is used for resetting storage controller 128; and
- a power fail module 314 that is used for performing a power fail operation or a soft power fail operation.

In some embodiments, the power fail module 314 optionally includes a transfer module 316 that is used for transferring data held in volatile memory to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 306 may store a subset of the modules and data structures identified above. Furthermore, memory 306 may store additional modules and data structures not described above. In some embodiments, the programs, modules, and data structures stored in memory 306, or the computer readable storage medium of memory 306, provide instructions for implementing respective operations in the methods described below with reference to FIGS. 6A-6D.

Although FIG. 3 shows a storage controller 128, FIG. 3 is intended more as a functional description of the various features which may be present in a storage controller than as a structural schematic of the embodiments described herein. In practice, and as recognized by those of ordinary skill in the art, items shown separately could be combined and some items could be separated.

Figure 4:
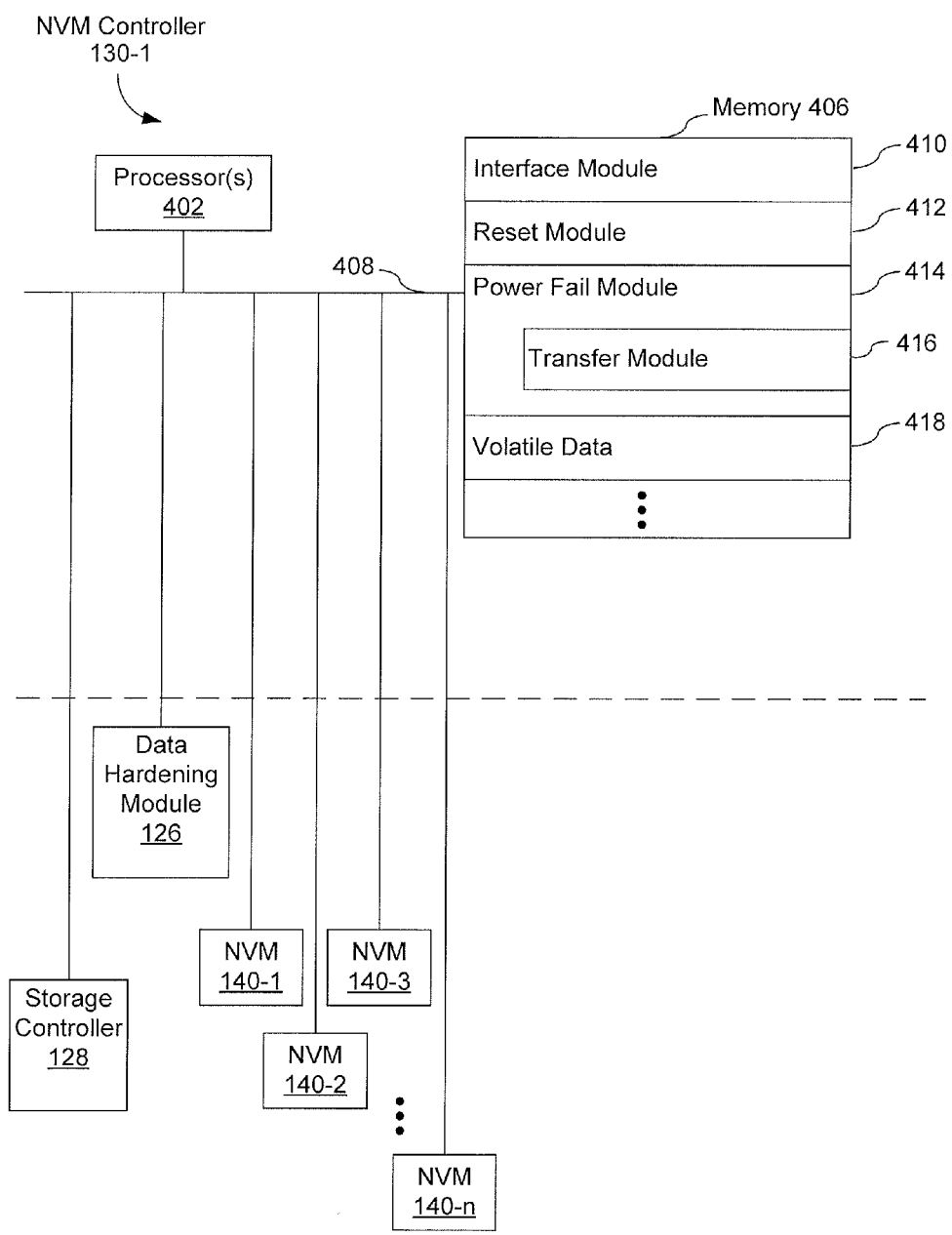
FIG. 4 is a block diagrams illustrating an implementation of a NVM controller, in accordance with some embodiments.

FIG. 4 is a block diagram illustrating an implementation of a NVM controller 130-1, such as a flash controller, in accordance with some embodiments. NVM controller 130-1 typically includes one or more processors (also sometimes called CPUs or processing units or microprocessors or microcontrollers) 402 for executing modules, programs and/or instructions stored in memory 406 and thereby performing processing operations, memory 406, and one or more communication buses 408 for interconnecting these components. Communication buses 408 optionally include circuitry (sometimes called a chipset) that interconnects and controls communications between system components. NVM controller 130-1 is coupled to storage controller 128, data hardening module 126, and NVM devices 140 (e.g., NVM devices 140-1 through 140-n, such as flash memory devices) by communication buses 408. Memory 406 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 406 optionally includes one or more storage devices remotely located from processor(s) 402. Memory 406, or alternately the non-volatile memory device(s) within memory 406, comprises a non-transitory computer readable storage medium. In some embodiments, memory 406, or the computer readable storage medium of memory 406 stores the following programs, modules, and data structures, or a subset thereof:

- an interface module 410 that is used for communicating with other components, such as storage controller 128, data hardening module 126, and NVM devices 140;
- a reset module 412 that is used for resetting NVM controller 130-1; and
- a power fail module 414 that is used for performing a power fail operation or a soft power fail operation.

In some embodiments, the power fail module 414 optionally includes a transfer module 416 that is used for transferring data held in volatile memory to non-volatile memory.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 406 may store a subset of the modules and data structures identified above. Furthermore, memory 406 may store additional modules and data structures not described above. In some embodiments, the programs, modules, and data structures stored in memory 406, or the computer readable storage medium of memory 406, provide instructions for implementing respective operations in the methods described below with reference to FIGS. 6A-6D.

Although FIG. 4 shows a NVM controller 130-1, FIG. 4 is intended more as a functional description of the various features which may be present in a NVM controller than as a structural schematic of the embodiments described herein. In practice, and as recognized by those of ordinary skill in the art, items shown separately could be combined and some items could be separated. Further, although FIG. 4 shows a NVM controller 130-1, the description of FIG. 4 similarly applies to other NVM controllers (e.g., NVM controllers 130-2 through 130-m) in storage device 120 (FIG. 1).

Figure 5:
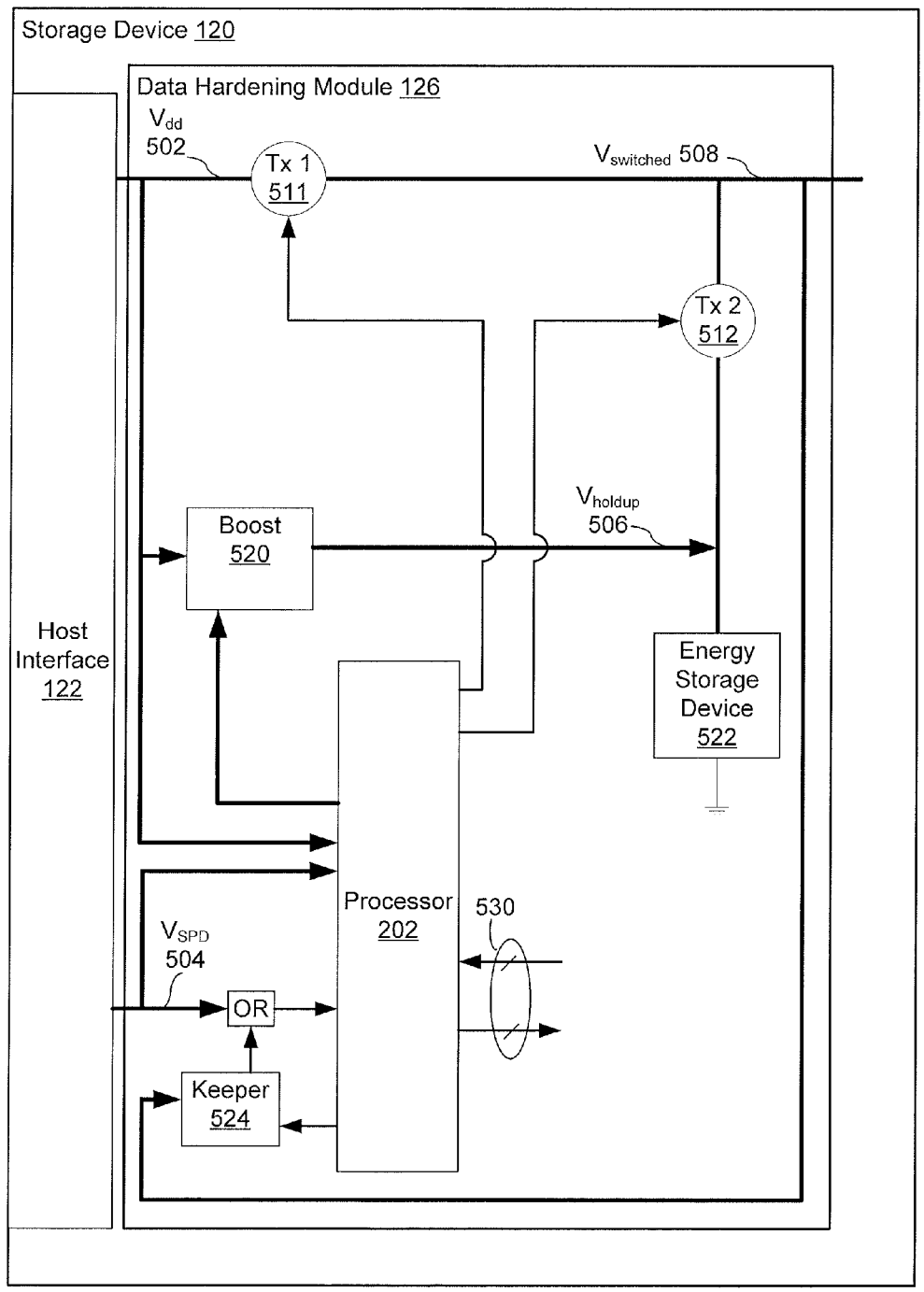
FIG. 5 is a block diagram illustrating an implementation of a data hardening module, in accordance with some embodiments.
Figure 6A:
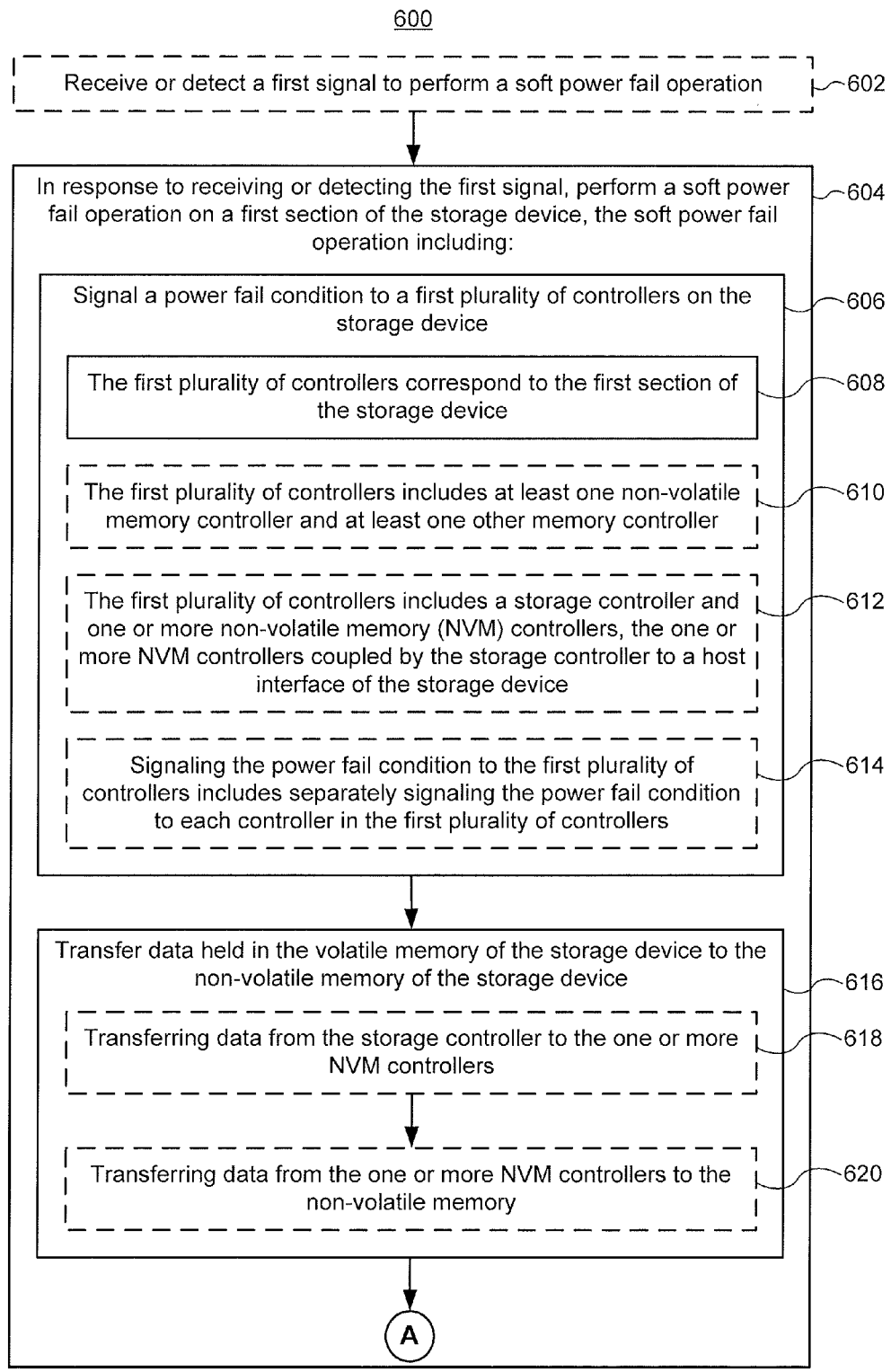
FIGS. 6A-6D illustrate a flowchart representation of a method of protecting data in a storage device, in accordance with some embodiments.
Figure 6B:
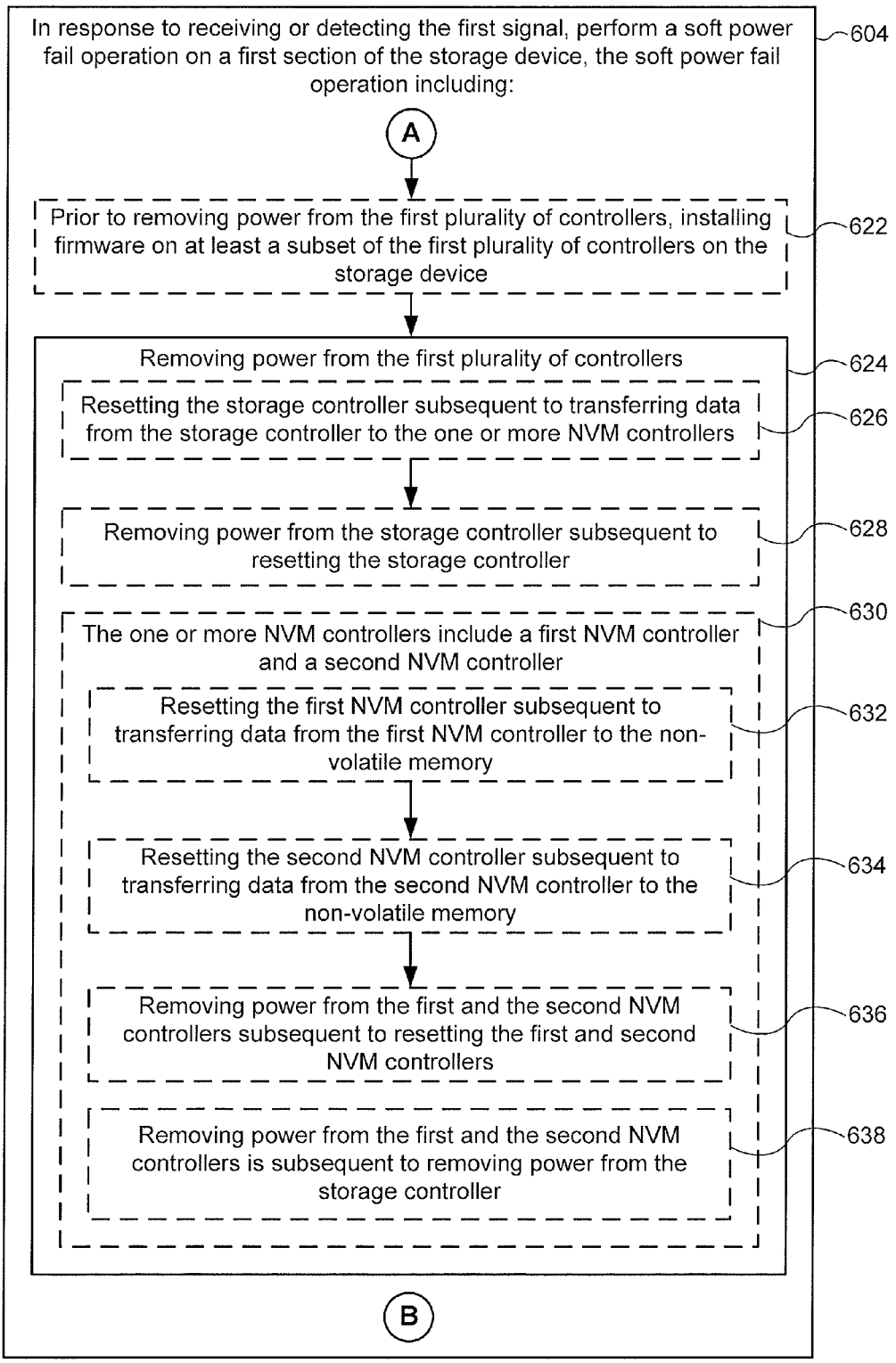
Figure 6C:
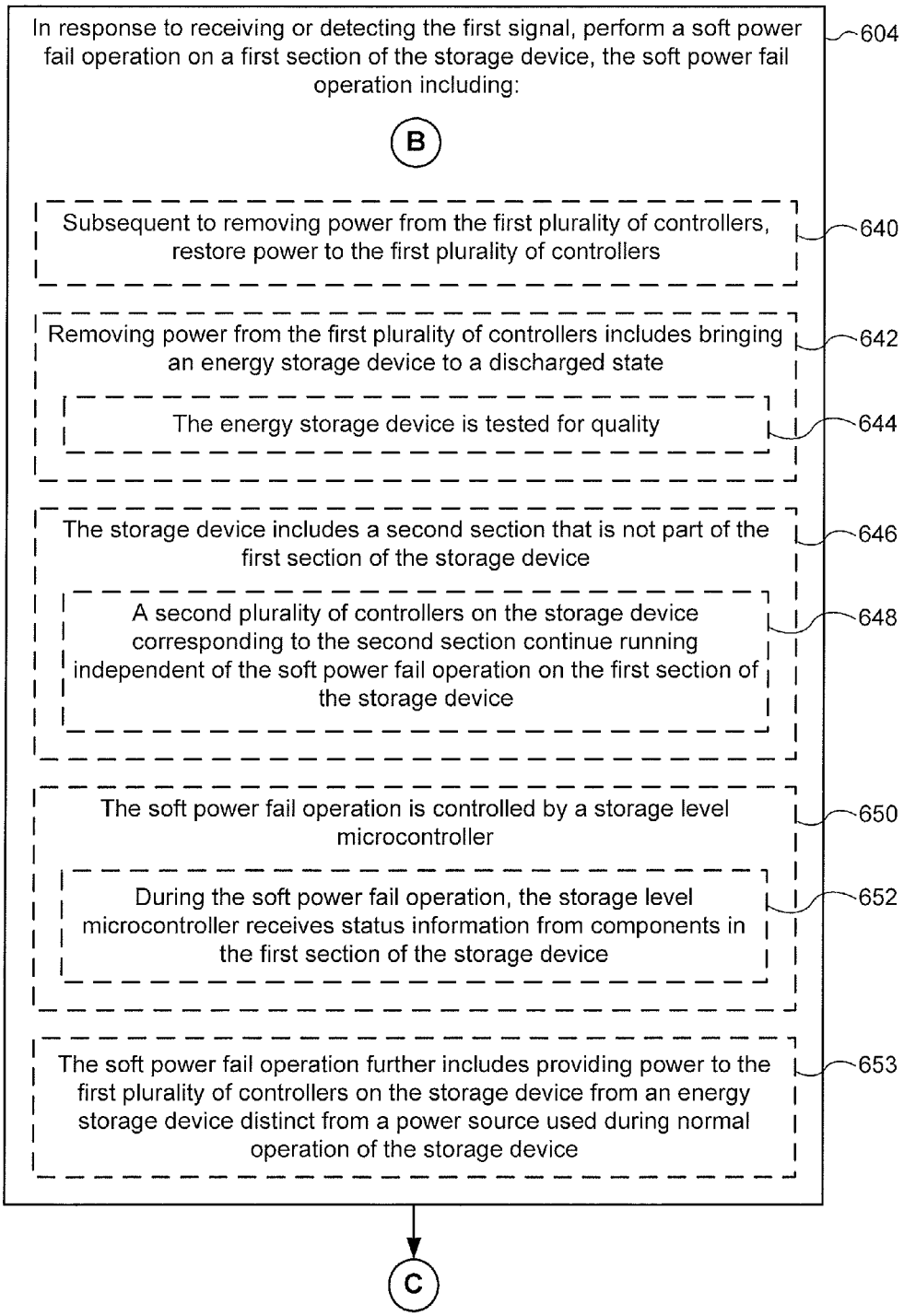
Figure 6D:
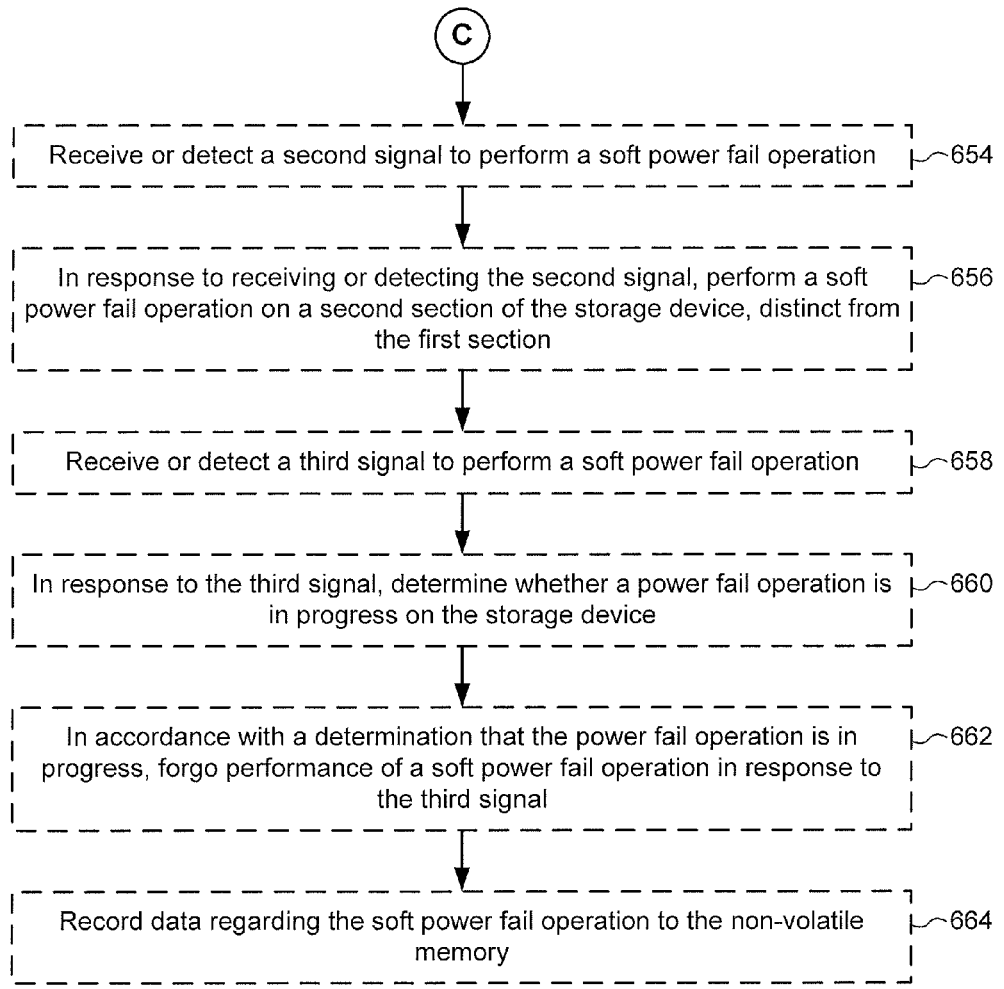

FIG. 5 is a block diagram illustrating an implementation of data hardening module 126, in accordance with some embodiments. While some example features are illustrated, various other features have not been illustrated for the sake of brevity and so as not to obscure more pertinent aspects of the example implementations disclosed herein. To that end, as a non-limiting example, data hardening module 126 includes processor 202, boost circuitry 520, energy storage device 522, transistors 511-512, keeper circuitry 524, voltages $V_{dd}$ 502, $V_{SPD}$ 504, $V_{holdup}$ 506, and $V_{switched}$ 508, and connections 530. In some implementations, $V_{dd}$ 502 is a voltage supplied by a host system (e.g., computer system 110, FIG. 1)

and has a target value of 1.5 volts or less. In some implementations, $V_{holdup}$ 506 is a boosted up voltage from $V_{dd}$ 502 and has a target value of 5.7 volts. In some embodiments, $V_{holdup}$ 506 is used to charge an energy storage device 522. In some implementations, $V_{SPD}$ 504 is a voltage supplied for serial presence detect (SPD) functionality and has a target value of 3.3 volts. Further, in some implementations, only one of transistors 511, 512 is enabled at any one time. For example, whenever transistor 512 is enabled, transistor 511 is disabled (open state), so as to ensure that power from the data hardening module's energy storage device 522 is not drained to the host system. Furthermore, whenever transistor 511 is enabled, providing power to components of storage device 120 from the host system, transistor 512 is disabled. In some implementations, both transistor 511 and transistor 512 can be disabled at the same time. For example, in some embodiments, removing power from a component of storage device 120 (e.g., storage controller 128 and/or NVM controllers 130) includes disabling both transistor 511 and transistor 512 at the same time. In some implementations, energy storage device 522 comprises a power holdup circuit, implemented using one or more capacitors. In some implementations, the data hardening module's energy storage device 522 stores, immediately prior to a power fail condition being detected, at least approximately 30 to 70 millijoules of energy per NVM controller 130 in storage device 120.

In some implementations, processor 202 monitors and manages the functionality in data hardening module 126. For example, processor 202 monitors voltages $V_{dd}$ 502 and $V_{SPD}$ 504. If either $V_{dd}$ 502 or $V_{SPD}$ 504 fall below corresponding under-voltage thresholds, processor 202 signals a power fail condition to a plurality of controllers on storage device 120 (e.g., storage controller 128 and NVM controllers 130, FIG. 1). In some embodiments, the under-voltage threshold varies depending on the target value of the voltage. For example, if the target voltage for $V_{dd}$ 502 is 1.5 volts, the under-voltage threshold may be 1.5 volts minus 5% (i.e., 1.425 volts), so processor 202 would signal a power fail condition if $V_{dd}$ 502 is lower than 1.425 volts. In some implementations, the under-voltage threshold for $V_{dd}$ 502 is different than the under-voltage threshold for $V_{SPD}$ 504.

In some embodiments, during regular operation of storage device 120, $V_{dd}$ 502 is used to supply power to storage device 120. However, during a power fail operation or a soft power fail operation, an energy storage device 522 is used to provide power to storage device 120. In some implementations, processor 202 controls transistors 511-512 to control $V_{switched}$ 508 to be voltage from $V_{dd}$ 502 (e.g., during regular operation) or voltage from energy storage device 522 (e.g., during a power fail operation or a soft power fail operation). For example, during regular operation of storage device 120, $V_{dd}$ 502 is used to supply power to storage device 120, so transistor 511 is turned on (e.g., to complete the connection between $V_{dd}$ 502 and $V_{switched}$ 508) and transistor 512 is turned off (e.g., to disable the connection between energy storage device 522 and $V_{switched}$ 508). However, during a power fail operation or a soft power fail operation, energy storage device 522 is used to provide power to storage device 120, so transistor 511 is turned off (e.g., to disable the connection between $V_{dd}$ 502 and $V_{switched}$ 508) and transistor 512 is turned on (e.g., to enable the connection between energy storage device 522 and $V_{switched}$ 508). In some embodiments, during a power fail operation or a soft power fail operation, $V_{switched}$ 508 is provided to power control systems (also sometimes called power regulators), which convert $V_{switched}$ 508 to the voltages required by various components of storage device 120 (e.g., 0.9V, 1.35V, 1.5V, 1.8V, and/or 2.5V) and provide those voltages to the appropriate components. Any energy storage device, including one or more capacitors, one or more inductors, or one or more other passive elements that store energy, may be used to store energy to be used during a power fail operation or a soft power fail operation.

In some implementations, energy storage device 522 is charged using $V_{holdup}$ 506, a voltage higher than $V_{dd}$ 502. In some implementations, $V_{dd}$ 502 is boosted up to $V_{holdup}$ 506 using boost circuitry 520 (e.g., 1.35 volts or 1.5 volts is boosted up to 5.7 volts). In some implementations, boost circuitry 520 is controlled and enabled by processor 202. Further, in some embodiments, $V_{switched}$ 508 is used as an input to keeper circuitry 524, which along with $V_{SPD}$ 504 provides power to processor 202. During a power fail operation or a soft power fail operation, $V_{switched}$ 508 is provided via keeper circuitry 524 to processor 202 so as to provide power to processor 202. In some implementations, processor 202 has one or more connections 530 used to monitor and control other functions within storage device 120. In some implementations, $V_{SPD}$ 504 provides power to keeper circuitry 524. Furthermore, in some implementations, $V_{SPD}$ 504 is provided to storage device 120 before $V_{dd}$ 502 is provided to storage device 120, allowing devices in storage device 120 to operate before main power $V_{dd}$ 502 is provide to storage device 120.

FIGS. 6A-6D illustrate a flowchart representation of a method 600 of protecting data in a storage device, in accordance with some embodiments. A storage device (e.g., storage device 120, FIG. 1) coordinates and manages multiple sub-system components to protect data, which initiates performance of method 600. At least in some implementations, method 600 is performed by a storage device (e.g., storage device 120, FIG. 1) or one or more components of the storage device (e.g., data hardening module 126, storage controller 128, and/or NVM controllers 130, FIG. 1). In some embodiments, method 600 is governed by instructions that are stored in a non-transitory computer readable storage medium and that are executed by one or more processors of a device, such as the one or more processors 202 of data hardening module 126, the one or more processors 302 of storage controller 128, and/or the one or more processors 402 of NVM controllers 130, as shown in FIGS. 2-4.

In some embodiments, a storage device comprising volatile memory and non-volatile memory (e.g., storage device 120, FIG. 1) receives or detects (602) a first signal to perform a soft power fail operation. In some circumstances or implementations, the first signal is construed to be a first signal or request to simulate a power failure. In some implementations, the soft power fail operation is initiated with an energy storage device in a charged state having energy capacity for memory device operation. In some implementations, the first signal is received from a host server (also sometimes called an end system) (e.g., computer system 110, FIG. 1). In some implementations, the first signal is received via a serial presence detect (SPD) interface (e.g., SPD 124, FIG. 1). In some implementations, the first signal is received via a host bus adapter (e.g., host interface 122, FIG. 1). In some implementations, the first signal is a hardware signal. In some implementations, the first signal is a command message (also sometimes called a protocol message).

In response to a first signal received or detected by the storage device, the storage device performs (604) a soft power fail operation on a first section of the storage device. In some implementations the first signal is received or detected by a data hardening module (e.g., data hardening module 126, FIG. 1) in the storage device. In some implementations, the storage device includes a dual in-line memory module (DIMM) device. In some implementations, the storage device is compatible with a DIMM memory slot. For example, in some implementations, the storage device is compatible with a 240-pin DIMM memory slot using a DDR3 interface specification. In some implementations, one or more power fail modules (e.g., power fail module 218, FIG. 2) are used to perform the soft power fail operation.

The soft power fail operation includes signaling (606) a power fail condition to a first plurality of controllers on the storage device, wherein the first plurality of controllers correspond (608) to the first section of the storage device. For example, in accordance with some embodiments, the first plurality of controllers includes storage controller 128 and NVM controller 130-1 on storage device 120 in FIG. 1. In some implementations, a signal module (e.g., signal module 220, FIG. 2) is used to signal the power fail condition to the first plurality of controllers on the storage device, as described above with respect to FIG. 2. In some implementations, one of the first plurality of controllers on the storage device maps double data rate (DDR) interface commands to serial advance technology attachment (SATA) interface commands. For example, a storage controller (e.g., storage controller 128, FIG. 1) maps double data rate type three (DDR3) interface commands to SATA interface commands. In some implementations, a storage controller (e.g., storage controller 128, FIG. 1) uses a defined interface standard, such as DDR3, to communicate with a host interface (e.g., host interface 122, FIG. 1) and uses a defined interface standard, such as SATA, to communicate with other controllers on the storage device (e.g., NVM controllers 130, FIG. 1).

In some embodiments, the first plurality of controllers includes (610) at least one non-volatile storage controller and at least one other storage controller. In some implementations, the at least one non-volatile storage controller is a flash controller. In other implementations, the at least one non-volatile storage controller controls one or more other types of non-volatile memory devices.

In some embodiments, the first plurality of controllers includes (612) a storage controller (e.g., storage controller 128, FIG. 1) and one or more NVM controllers (e.g., NVM controllers 130, FIG. 1), the one or more NVM controllers coupled by the storage controller to a host interface (e.g., host interface 122, FIG. 1) of the storage device.

In some embodiments, signaling the power fail condition to the first plurality of controllers includes separately signaling (614) the power fail condition to each controller in the first plurality of controllers. In some implementations, the separate signaling enables a sequential sequence for the soft power fail operation. In some other implementations, the separate signaling enables a parallel sequence for the soft power fail operation. In some implementations, the separate signaling enables a combination of sequential and parallel sequences for the soft power fail operation.

The soft power fail operation further includes transferring (616) data held in the volatile memory of the storage device to the non-volatile memory (e.g., NVM devices 140, 142, FIG. 1) on the storage device. In some implementations, the non-volatile memory includes a single NVM device, while in other implementations the non-volatile memory includes a plurality of NVM devices. In some implementations, the non-volatile memory includes NAND-type flash memory and/or NOR-type flash memory. In other embodiments, the non-volatile memory comprises one or more other types of non-volatile storage devices. In some implementations, a soft power fail module on one or more controllers (e.g., power fail module 314, FIG. 3 and power fail module 414, FIG. 4) are used to transfer data held in volatile memory to non-volatile memory, as described above with respect to FIGS. 3-4.

In some embodiments, transferring data held in volatile memory of the storage device to non-volatile memory of the storage device includes transferring (618) data (e.g., volatile data 318, FIG. 3) from the storage controller (e.g., storage controller 128, FIG. 1) to the one or more NVM controllers (e.g., NVM controllers 130, FIG. 1); and transferring (620) data (e.g., volatile data 418, FIG. 4) from the one or more NVM controllers (e.g., NVM controllers 130, FIG. 1) to the non-volatile memory (e.g., NVM devices 140, 142, FIG. 1). In some implementations, data transferred from the storage controller to the one or more NVM controllers includes data in flight from the host interface (e.g., host interface 122, FIG. 1) to the storage controller, data that has been signaled to the host (e.g., computer system 110, FIG. 1) as saved (e.g., stored in a non-volatile store or write cache), and/or metadata stored in volatile memory in the storage controller. In some implementations, a transfer module (e.g., transfer module 316, FIG. 3) is used to transfer data from the storage controller to the one or more NVM controllers, as described above with respect to FIG. 3. In some implementations, data transferred from the one or more NVM controllers to the non-volatile memory includes data in flight to the one or more NVM controllers and/or metadata stored in volatile memory in the one or more NVM controllers (e.g., unwritten parity data, information about current age of the NVM (e.g., flash memory) devices, translation tables, etc.). In some implementations, a transfer module (e.g., transfer module 416, FIG. 4) is used to transfer data from the one or more NVM controllers to the non-volatile memory, as described above with respect to FIG. 4.

In some embodiments, the soft power fail operation further includes, prior to removing power from the first plurality of controllers, installing (622) firmware on at least a subset of the first plurality of controllers (e.g., storage controller 128, FIG. 1) on the storage device. For example, in some implementations, a soft power fail operation is used to install firmware, such as a firmware update, on one or more controllers within the storage device.

The soft power fail operation further includes removing (624) power from the first plurality of controllers on the storage device (e.g., storage controller 128 and NVM controllers 130, FIG. 1). In some implementations, a power removal module (e.g., power removal module 224, FIG. 2) is used to remove power from the plurality of controllers on the storage device, as described above with respect to FIG. 2. In some embodiments, power is removed from only a subset of the first plurality of controllers (e.g., NVM controllers 130-1, FIG. 1). In some implementations, removing power from a controller comprises resetting the controller (e.g., using reset module 222, FIG. 2).

In some embodiments, removing power from the first plurality of controllers on the storage device includes resetting (626) the storage controller subsequent to transferring data from the storage controller to the one or more NVM controllers. In some implementations, the storage controller (e.g., storage controller 128, FIG. 1) sends a signals to a data hardening module (e.g., data hardening module 126, FIG. 1) when it has completed transferring data to the one or more NVM controllers (e.g., NVM controllers 130, FIG. 1). When the data hardening module receives this signal (e.g., a data hardening done signal), it can then reset the storage controller. In some implementations, resetting the storage controller puts the storage controller in a predefined low power state. In some implementations, resetting the storage controller is controlled by a data hardening module and reset functionality is disabled while data is being transferred to non-volatile memory (e.g., the data hardening module prevents the storage controller from being reset when the storage controller is transferring data held in volatile memory to non-volatile memory). In some implementations, a reset module in the data hardening module (e.g., reset module 222, FIG. 2) in conjunction with a reset module in the storage controller (e.g., reset module 312, FIG. 3) is used to reset the storage controller subsequent to transferring data from the storage controller to the one or more NVM controllers, as described above with respect to FIGS. 2-3.

In some embodiments, removing power from the first plurality of controllers on the storage device includes removing (628) power from the storage controller subsequent to resetting the storage controller. In some implementations, the storage controller (e.g., storage controller 128, FIG. 1) is in a separate power domain from the one or more NVM controllers (e.g., NVM controller 130, FIG. 1). Thus, power may be removed from the storage controller, regardless of whether the NVM controllers are still transferring data to non-volatile memory. These independent power domains allow the data hardening module (e.g., data hardening module 126, FIG. 1) to selectively remove power from the various controllers on the storage device (e.g., storage device 120, FIG. 1). By selectively removing power to controllers as they are ready, the data hardening module preserves the power stored in the energy storage device (e.g., energy storage device 204, FIG. 2) for remaining tasks in the power fail operation. In some implementations, a power removal module (e.g., power removal module 224, FIG. 2) is used to remove power from the storage controller subsequent to resetting the storage controller, as described above with respect to FIG. 2.

In some embodiments, the one or more NVM controllers include (630) a first NVM controller and a second NVM controller and removing power from the first plurality of controllers on the storage device includes resetting (632) the first NVM controller subsequent to transferring data from the first NVM controller to the non-volatile memory. In some implementations, the first NVM controller (e.g., NVM controller 130-1, FIG. 1) sends a signal the data hardening module (e.g., data hardening module 126, FIG. 1) when it has completed transferring data to the non-volatile memory (e.g., NVM devices 140). When the data hardening module receives this signal (e.g., a data hardening done signal), it can then reset the first NVM controller. In some implementations, resetting the first NVM controller puts the first NVM controller in a predefined low power state. In some implementations, the data hardening module prevents the first NVM controller from being reset when the first NVM controller is transferring data held in volatile memory to non-volatile memory. In some implementations, a reset module in the data hardening module (e.g., reset module 222, FIG. 2) in conjunction with a reset module in the first NVM controller (e.g., reset module 412, FIG. 4) is used to reset the first NVM controller subsequent to transferring data from the first NVM controller to the non-volatile memory, as described above with respect to FIGS. 2 and 4.

In some embodiments, the one or more NVM controllers include (630) a first NVM controller and a second NVM controller and removing power from the plurality of controllers on the storage device further includes resetting (634) the second NVM controller subsequent to transferring data from the second NVM controller to the non-volatile memory. Explanations provided above in connection with resetting the first NVM controller are equally applicable to resetting the second NVM controller. In some implementations, a reset module in the data hardening module (e.g., reset module 222, FIG. 2) in conjunction with a reset module in the second NVM controller (e.g., reset module 412, FIG. 4) is used to reset the second NVM controller subsequent to transferring data from the second NVM controller to the non-volatile memory, as described above with respect to FIGS. 2 and 4.

In some embodiments, the one or more NVM controllers include (630) a first NVM controller and a second NVM controller (e.g., first and second flash controllers) and removing power from the plurality of controllers on the storage device further includes removing (636) power from the first and the second NVM controllers subsequent to resetting the first and second NVM controllers. In some implementations, the first NVM controller and the second NVM controller share the same power domain, and power is removed from the first and the second NVM controllers after both the first and the second NVM controllers have been reset. In some implementations, the first NVM controller is in a first power domain and the second NVM controller is in a second power domain, and power is removed from the first NVM controller independent of when power is removed from the second NVM controller. In some implementations, a power removal module (e.g., power removal module 224, FIG. 2) is used to remove power from the first and the second NVM controllers subsequent to resetting the first and second NVM controllers, as described above with respect to FIG. 2.

In some embodiments, removing (638) power from the first and the second NVM controllers is subsequent to removing power from the storage controller. As discussed above, independent power domains on the storage device allow the data hardening module (e.g., data hardening module 126, FIG. 1) to selectively remove power from the various controllers on the storage device (e.g., storage controller 128 and NVM controllers 130, FIG. 1). In some implementations, data hardening is completed in a cascading manner since the NVM controllers cannot finish hardening data until they have received all the volatile data that needs to be transferred from the storage controller. As a result, the storage controller will complete its data hardening first and thus, power will be removed from the storage controller before power is removed from the first and the second NVM controllers. In some embodiments, power is not removed from the storage controller during the soft power fail operation. For example, if the storage controller interacts with multiple NVM controllers and a subset of the NVM controllers are not within the section of the storage device designated for the soft power fail operation, then the storage controller will not be reset or powered down.

In some embodiments, the soft power fail operation further includes, subsequent to removing power from the first plurality of controllers, restoring (640) power to the first plurality of controllers. In some implementations, the power is restored to the plurality of controllers in parallel. In some implementations, the power is restored in a predefined sequence.

In some embodiments, removing power from the first plurality of controllers includes (642) bringing an energy storage device (e.g., energy storage device 204, FIG. 2) to a discharged state. In some implementations, the discharged state is a zero energy state. In some implementations, the energy storage device is a reserve energy storage device. In some implementations, the reserve energy storage device is separate from the storage device (e.g., storage device 120). In some implementations, the energy storage device includes one or more capacitors. In some implementations, the storage device brings the energy storage device to a discharged state subsequent to removing power from the first plurality of controllers on the storage device. In some implementations, subsequent to removing power from the first plurality of controllers (e.g., storage controller 128 and NVM controllers 130, FIG. 1) on the storage device (e.g., storage device 120, FIG. 1), the storage device discharges the energy storage device (e.g., energy storage device 204, FIG. 2) and the storage device shuts down like a regular hard power down. In some implementations, discharging the energy storage device includes discharging one or more capacitors of the energy storage device. In some implementations, a discharge module (e.g., discharge module 228, FIG. 2) is used to discharge the energy storage device subsequent to removing power from the plurality of controllers on the storage device, as described above with respect to FIG. 2.

In some embodiments, the energy storage device is tested (644) for quality. In some implementations, a data hardening module (e.g., data hardening module 126, FIG. 1) performs health monitoring for the energy storage device and monitors the capacitor(s) in the energy storage device. For example, if the preferred charged state is a charge level at or above 98% (or, alternatively, 95% or 90%) of charge capacity, the data hardening module monitors the energy storage device to ensure the capacitor(s) in the energy storage device are charged to at least 98% (or, alternatively, 95% or 90%) of charge capacity. In some implementations, if one or more capacitors of the energy storage device are not charged to at least the first charge level, the storage device performs one or more remedial actions (e.g., further charging the one or more capacitors). In some implementations, an energy storage device module (e.g., energy storage device module 212, FIG. 2) is used to monitor the energy storage device to ensure capacitors in the energy storage device are charged to at least a first charge level, as described above with respect to FIG. 2. In some implementations, a data hardening module (e.g., data hardening module 126, FIG. 1) uses an algorithm to selectively test one or more capacitors from the energy storage device during operation of the storage device. In some implementations, one or more capacitors from the energy storage device are tested during regular operation of the storage device (as opposed to during a soft power fail operation). Since testing the capacitor(s) will discharge the capacitor(s), the data hardening module manages the coordination of testing the capacitor(s) to ensure that testing of the capacitor(s) from the energy storage device does not interfere with other operations. In some implementations, an energy storage device module (e.g., energy storage device module 212, FIG. 2) is used to selectively test one or more capacitors from the energy storage device during operation of the storage device, as described above with respect to FIG. 2.

In some embodiments, testing the energy storage device for quality includes charging the energy storage device to a higher voltage than the power supply voltage provided to the storage device and determining whether the energy storage device (e.g., energy storage device 204, FIG. 2) meets a minimum charge level threshold within a predefined charge time. For example, if the minimum charge level threshold is 95% charge capacity and the predefined charge time is 25 ms, the storage device determines whether the energy storage device is charged to at least 95% charge capacity within 25 ms. In some implementations, an energy storage device module (e.g., energy storage device module 212, FIG. 2) is used to determine whether the energy storage device meets a minimum charge level threshold within a predefined charge time, as described above with respect to FIG. 2. Further, in accordance with a determination that the energy storage device does not meet the minimum charge level threshold in the predefined charge time, the storage device prevents operation of the storage device. In some implementations, a determination that the energy storage device does not meet the minimum charge level threshold in the predefined charge time indicates that there will be a data hardening failure when a power fail operation is performed in the future (e.g., a predictive failure detection). As a result, operation of the storage device is prevented to avoid a future data hardening failure. In some implementations, an energy storage device module (e.g., energy storage device module 212, FIG. 2) is used to prevent operation of the storage device, in accordance with a determination that the energy storage device does not meet the minimum charge level threshold in the predefined charge time, as described above with respect to FIG. 2. In some implementations, preventing operation of the storage device includes communicating a failure message to a host system (e.g., computer system 110, FIG. 1). In some implementations, the failure message is communicated with the host system through a SPD device (e.g., SPD device 124, FIG. 1) or a SPD bus controller.

In some embodiments, the storage device includes (646) a second section that is not part of the first section of the storage device; and a second plurality of controllers on the storage device corresponding to the second section continue running (648) independent of the soft power fail operation on the first section of the storage device (see 604). For example, in accordance with some implementations, the first section of a storage device corresponds to a first NVM controller (e.g., NVM controller 130-1, FIG. 1) and the second section of the storage device corresponds to a second NVM controller (e.g., NVM controller 130-m, FIG. 1).

In some embodiments, the soft power fail operation is controlled (650) by a storage level microcontroller; and, during the soft power fail operation, the storage level microcontroller receives (652) status information from components in the first section of the storage device. In some implementations, the storage level microcontroller is a storage controller (e.g., storage controller 128, FIG. 1). In some implementations, the storage level microcontroller comprises a data hardening module (e.g., data hardening module 126, FIG. 1). In some implementations, the status information is used to assess the health of the first section.

In some embodiments, the soft power fail operation further includes providing (653) power to the first plurality of controllers on the storage device from an energy storage device (e.g., energy storage device 204, FIG. 2) distinct from a power source used during normal operation of the storage device. For example, in accordance with some implementations, FIG. 5 shows $V_{dd}$ 502 as a power source used during normal operation of storage device 120 and shows energy storage device 522 as the power source used during a soft power fail operation (e.g., by switching Tx1 511 open and Tx2 512 closed). In some implementations, removing power from the first plurality of storage controllers comprises allowing the energy storage device to deplete.

In some embodiments, the storage device receives or detects (654) a second signal to perform a soft power fail operation. In some implementations the second signal is received by the aforementioned data hardening module (e.g., data hardening module 126, FIG. 1).

In some embodiments, in response to a second signal received or detected by the storage device, the storage device performs (656) a soft power fail operation on a second section of the storage device, distinct from the first section of the storage device. For example, in accordance with some implementations, the first section of the storage device corresponds to a first NVM controller (e.g., NVM controller 130-1, FIG. 1) and the second section of the storage device corresponds to a second NVM controller (e.g., NVM controller 130-m, FIG. 1). In this example, in response to the first signal, the storage device performs a first soft power fail operation on the first section (e.g., the section corresponding to NVM controller 130-1) and, in response to the second signal, the storage device performs a second soft power fail operation on the second section (e.g., the section corresponding to NVM controller 130-m).

In some embodiments, the storage device receives or detects (658) a third signal to perform a soft power fail operation. In some implementations the third signal is received by the data hardening module (e.g., data hardening module 126, FIG. 1).

In some embodiments, in response to a third signal received by the storage device, the storage device determines (660) whether a power fail operation is in progress on the storage device; and, in accordance with a determination that the power fail operation is in progress, the storage device forgoes (662) performance of a soft power fail operation in response to the third signal. In some implementations, a storage level microcontroller determines whether a power fail operation is in progress on the storage device. In some implementations, a data hardening module determines (e.g., with power fail module 218) whether a power fail operation is in progress on the storage device. In some implementations, a storage controller determines (e.g., with power fail module 314) whether a power fail operation is in progress on the storage device.

In some embodiments, the storage device records (664) data regarding the soft power fail operation to non-volatile memory. In some implementations, recording data regarding the soft power fail operation includes: (1) recording power supply voltages (e.g., $V_{dd}$ or $V_{SPD}$), (2) recording which signal triggered the soft power fail operation, (3) recording the real time when the soft power fail event happened (e.g., Monday, Oct. 15, 2013, at 12:03:17 AM), (4) recording the length of time the soft power fail operation took to complete, (5) recording whether the soft power fail operation was successful, (6) recording information regarding the quality of an energy storage device (e.g., energy storage device 204, FIG. 2), and (7) recording other information regarding the soft power fail operation (e.g., whether firmware was installed). In some implementations, only a subset of the above listed information is recorded.

In some implementations, with respect to any of the methods described above, the non-volatile memory is a single NVM device (e.g., flash memory device), while in other implementations, the non-volatile memory includes a plurality of NVM devices (e.g., flash memory devices).

In some implementations, with respect to any of the methods described above, a storage device includes (1) a plurality of controllers, where each of the plurality of controllers is configured to transfer data held in volatile memory to non-volatile memory and where the first plurality of controllers comprise some or all of said plurality of controllers, and (2) a data hardening module including one or more processors and an energy storage device, the storage device configured to perform or control performance of any of the methods described above.

In some implementations, with respect to any of the methods described above, a storage device includes an interface for coupling the storage device to a host system.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of protecting data in a storage device comprising volatile memory and non-volatile memory, the method comprising:
   in response to receiving or detecting a first signal to simulate a power failure, performing a soft power fail operation on a first section of the storage device, the soft power fail operation including:
      signaling a power fail condition to a first plurality of controllers on the storage device, wherein the first plurality of controllers correspond to the first section of the storage device;
      transferring data held in the volatile memory of the storage device to the non-volatile memory of the storage device; and
      removing power from the first plurality of controllers.

2. The method of claim 1, wherein the first plurality of controllers includes at least one non-volatile storage controller and at least one other storage controller.

3. The method of claim 1, wherein the first plurality of controllers includes a storage controller and one or more non-volatile memory (NVM) controllers, the one or more NVM controllers coupled by the storage controller to a host interface of the storage device.

4. The method of claim 3, wherein transferring data held in the volatile memory of the storage device to the non-volatile memory of the storage device includes:

transferring data from the storage controller to the one or more NVM controllers; and transferring data from the one or more NVM controllers to the non-volatile memory.

5. The method of claim 4, wherein removing power from the first plurality of controllers includes:

resetting the storage controller subsequent to transferring data from the storage controller to the one or more NVM controllers; and removing power from the storage controller subsequent to resetting the storage controller.

6. The method of claim 4, wherein the one or more NVM controllers include a first NVM controller and a second NVM controller, and wherein removing power from the first plurality of controllers includes:

resetting the first NVM controller subsequent to transferring data from the first NVM controller to the non-volatile memory;

resetting the second NVM controller subsequent to transferring data from the second NVM controller to the non-volatile memory; and removing power from the first and the second NVM controllers subsequent to resetting the first and second NVM controllers.

7. The method of claim 6, wherein removing power from the first and the second NVM controllers is subsequent to removing power from the storage controller.

8. The method of claim 1, wherein the soft power fail operation further includes, subsequent to removing power from the first plurality of controllers, restoring power to the first plurality of controllers.

9. The method of claim 1, wherein the storage device includes a second section that is not part of the first section; and wherein a second plurality of controllers on the storage device corresponding to the second section continue running independent of the soft power fail operation on the first section of the storage device.

10. The method of claim 1, wherein removing power from the first plurality of controllers includes bringing an energy storage device to a discharged state.

11. The method of claim 10, wherein the energy storage device is tested for quality.

12. The method of claim 1, wherein the soft power fail operation further includes providing power to the first plurality of controllers on the storage device from an energy storage device distinct from a power source used during normal operation of the storage device.

13. The method of claim 1, wherein the soft power fail operation further includes, prior to removing power from the first plurality of controllers, installing firmware on at least a subset of the first plurality of controllers on the storage device.

14. The method of claim 1, further including:

in response to a second signal received by the storage device, performing a soft power fail operation on a second section of the storage device, distinct from the first section.

15. The method of claim 1, wherein the soft power fail operation is controlled by a storage level microcontroller; and wherein, during the soft power fail operation, the storage level microcontroller receives status information from components in the first section of the storage device.

16. The method of claim 1, further including:

in response to a third signal received by the storage device, determining whether a power fail operation is in progress on the storage device; and in accordance with a determination that the power fail operation is in progress, forgoing performance of a soft power fail operation in response to the third signal.

17. The method of claim 1, wherein signaling the power fail condition to the first plurality of controllers on the storage device includes separately signaling the power fail condition to each controller in the first plurality of controllers.

18. The method of claim 1, further comprising recording data regarding the soft power fail operation to non-volatile memory.

19. A storage device, comprising:

a first plurality of controllers, each of the first plurality of controllers configured to transfer data held in volatile memory to non-volatile memory; and a data hardening module including an energy storage device, the data hardening module configured to:

receive or detect a first signal to simulate a power failure;

in response to receiving or detecting the first signal, perform a soft power fail operation on a first section of the storage device, the soft power fail operation including:

signaling a power fail condition to a second plurality of controllers on the storage device, wherein the second plurality of controllers correspond to the first section of the storage device and comprise some or all of the first plurality of controllers;

transferring data held in volatile memory to non-volatile memory; and removing power from the first plurality of controllers.

20. The storage device of claim 19, wherein the second plurality of controllers includes at least one non-volatile storage controller and at least one other storage controller.

21. The storage device of claim 19, wherein the second plurality of controllers includes a storage controller and one or more non-volatile memory (NVM) controllers, the one or more NVM controllers coupled by the storage controller to a host interface of the storage device.

22. The storage device of claim 21, wherein transferring data held in the volatile memory of the storage device to the non-volatile memory of the storage device includes:

transferring data from the storage controller to the one or more NVM controllers; and transferring data from the one or more NVM controllers to the non-volatile memory.

23. A non-transitory computer readable storage medium, storing one or more programs for execution by one or more processors of a storage device having a plurality of controllers and a data hardening module, the one or more programs including instructions that when executed by the one or more processors of the storage device cause the storage device to:

receive or detect a first signal to simulate a power failure;

in response to receiving or detecting the first signal, perform a soft power fail operation on a first section of the storage device, the soft power fail operation including:

signaling a power fail condition to a first plurality of controllers on the storage device, wherein the first plurality of controllers correspond to the first section of the storage device;

transferring data held in volatile memory to non-volatile memory; and removing power from the first plurality of controllers.

24. The non-transitory computer readable storage medium of claim 23, wherein the non-transitory computer readable storage medium includes a non-transitory computer readable storage medium associated with each of the plurality of controllers on the storage device and a non-transitory computer readable storage medium associated with the data hardening module.

25. The non-transitory computer readable storage medium of claim 23, wherein the first plurality of controllers includes at least one non-volatile storage controller and at least one other storage controller.

26. The non-transitory computer readable storage medium of claim 23, wherein the first plurality of controllers includes a storage controller and one or more non-volatile memory (NVM) controllers, the one or more NVM controllers coupled by the storage controller to a host interface of the storage device.

27. The non-transitory computer readable storage medium of claim 23, wherein transferring data held in the volatile memory of the storage device to the non-volatile memory of the storage device includes:
    transferring data from the storage controller to the one or more NVM controllers; and
    transferring data from the one or more NVM controllers to the non-volatile memory.

\* \* \* \* \*

UNITED STATES PATENT AND TRADEMARK OFFICE
CERTIFICATE OF CORRECTION

PATENT NO. : 9,244,785 B2  Page 1 of 1
APPLICATION NO. : 14/135456
DATED : January 26, 2016
INVENTOR(S) : Lucas et al.

It is certified that error appears in the above-identified patent and that said Letters Patent is hereby corrected as shown below:

In the claims,

Claim 1, column 20, line 51, please delete "correspond" and insert --corresponds--;

Claim 9, column 21, line 36, please delete "continue" and insert --continues--.

Signed and Sealed this
Twenty-sixth Day of April, 2016

Michelle K. Lee
*Director of the United States Patent and Trademark Office*